US011139485B2

(12) United States Patent
Aykol et al.

(10) Patent No.: US 11,139,485 B2
(45) Date of Patent: Oct. 5, 2021

(54) COMPOSITIONS AND PROCESSES FOR OPTIMIZING OXYGEN REDUCTION AND OXYGEN EVOLUTION REACTIONS

(71) Applicant: Toyota Research Institute, Inc., Los Altos, CA (US)

(72) Inventors: Muratahan Aykol, San Jose, CA (US); Joseph Harold Montoya, Berkeley, CA (US); Jens Strabo Hummelshøj, Millbrae, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 50 days.

(21) Appl. No.: 16/429,648

(22) Filed: Jun. 3, 2019

(65) Prior Publication Data
US 2020/0381745 A1 Dec. 3, 2020

(51) Int. Cl.
H01M 4/90 (2006.01)
H01M 4/86 (2006.01)
H01M 12/08 (2006.01)

(52) U.S. Cl.
CPC ....... *H01M 4/9016* (2013.01); *H01M 4/8663* (2013.01); *H01M 12/08* (2013.01); *H01M 2004/8689* (2013.01)

(58) Field of Classification Search
CPC .. H01M 4/9016; H01M 4/8663; H01M 12/08; H01M 2004/8689
See application file for complete search history.

(56) References Cited

U.S. PATENT DOCUMENTS

2011/0274989 A1* 11/2011 Lu ............... H01M 4/92 429/405
2017/0194643 A1* 7/2017 Ahn ................ C01G 53/006

FOREIGN PATENT DOCUMENTS

WO WO-2017073058 A1 * 5/2017 ............ H01M 4/131

OTHER PUBLICATIONS

Asakura, K., Okada, S., Arai, H., Tobishima, S., & Sakurai, Y. (1999). Cathode properties of layered structure Li2PtO3. Journal of Power Sources, 81-82, 388-392. doi:10.1016/s0378-7753(99)00113-5 (Year: 1999).*
Itagaki et al., "LiCoO2 electrode/electrolyte interface of Li-ion rechargeable batteries investigated by in situ electrochemical impedance spectroscopy," Journal of Power Sources, vol. 148, pp. 78-84, Abstract (2005).
Kuznetsov et al., "Tuning Redox Transitions via Inductive Effect in Metal Oxides and Complexes, and Implications in Oxygen Electrocatalysis," Joule, vol. 2, pp. 225-244 (2018).

(Continued)

*Primary Examiner* — Christopher P Domone
*Assistant Examiner* — Kimberly Wyluda
(74) *Attorney, Agent, or Firm* — Christopher G. Darrow; Darrow Mustafa PC

(57) ABSTRACT

Compositions and process for optimizing oxygen reduction and oxygen evolution reactions are provided. Oxygen reduction and oxygen evolution catalysts include oxide compositions having a general formula a formula $A_{2-x}MO_y$, where x is electrochemically tuned to find optimal A content that delivers the best catalytic performance in a chemical system. The process provides the ability to find the optimal catalytic performance by tuning A and hence, the binding strength of O.

8 Claims, 2 Drawing Sheets

(56) References Cited

OTHER PUBLICATIONS

Lu et al., "Lithium Electrochemical Tuning for Electrocatalysis," Advanced Materials, vol. 30, Issue 48, Abstract (2018).
Colligan et al., "Evidence of Localized Lithium Removal in Layered and Lithiated Spinel Li1—xCoO2 ($0 \leq x \leq 0.9$) under Oxygen Evolution Reaction Conditions," J. Phys. Chem. C, 119, 5, 2335-2340, Abstract (2015).
Lu et al., "Electrochemical tuning of layered lithium transition metal oxides for improvement of oxygen evolution reaction," Nature Communications, 5:4345, pp. 1-7 (2014).

\* cited by examiner

COMPOSITIONS AND PROCESSES FOR OPTIMIZING OXYGEN REDUCTION AND OXYGEN EVOLUTION REACTIONS

Compositions and process for optimizing oxygen reduction and oxygen evolution reactions are provided. More specifically, oxygen reduction and oxygen evolution catalyst materials are provided that can be optimized by adjusting an oxygen vacancy formation energy or oxygen binding energy and stabilized via adjusting an electrolyte composition.

BACKGROUND

Fuel cells are receiving increasing attention as a viable energy-alternative. In general, fuel cells convert electrochemical energy into electrical energy in an environmentally clean and efficient manner. Fuel cells are contemplated as potential energy sources for everything from small electronics to cars and homes. In order to meet different energy requirements, there are a number of different types of fuel cells in existence today, each with varying chemistries, requirements, and uses.

Electrolyzers which split $H_2O$ into $H_2$, a potential fuel, and $O_2$, an anodic byproduct of water electrolysis, typically use rare materials like Pt as cathodes and $IrO_2$ or $RuO_2$ as anodes. In the reverse process, a fuel cell converts $H_2$ fuel and an $O_2$ reagent into $H_2O$ using similarly rare Pt and rare-earth oxide catalysts, extracting the energy from the electrons shuttled between the oxidation of $H_2$ and the reduction of $O_2$ at the fuel cell anode and cathode, respectively. Although precious metal catalysts like Pt, $IrO_2$, and $RuO_2$ typically do accelerate the reactions involved, these devices are still inhibited by slow reaction kinetics of both the oxygen evolution reaction (OER) and oxygen reduction reaction (ORR) at the electrolyzer anode and fuel cell cathode, respectively.

Typical metal-air batteries comprise anodes that are formed using metals such as zinc (Zn), aluminum (Al) and lithium (Li) and typical fuel cells comprise $H_2$ gas oxidized in an anode reaction to produce protons (hydrogen ions), often on a catalyst such as Pt. During the discharge of such batteries and fuel cells, oxidation of the metal or $H_2$ occurs at the anode, which releases electrons which are transported via an external circuit to a cathode. At the cathode, an oxygen reduction reaction occurs, converting oxygen from air and water from an electrolyte into hydroxide ions in zinc-air and aluminum-air batteries, or converting oxygen from air to an oxide of anode-metal (e.g. $Li_2O_2$) in lithium-air batteries or converting oxygen from air to water by reaction with protons. In zinc-air batteries in particular, hydroxide ions then migrate through the electrolyte to reach the anode where they form a metal salt (e.g. zincate), which decays into a metal oxide (e.g. zinc oxide). As such, the metallic anode gradually becomes depleted over time in a primary metal-air battery, thus requiring a continuous supply of metal for long term operation. However, the depletion of the anode can be mitigated by introducing oxygen evolution reactions at the cathode while the battery or the fuel cell is not being discharged. This result in oxygen reduction reactions occurring at the anode, which in turn causes metal to be regenerated at the anode. However, the oxygen reduction reaction (ORR) and the oxygen evolution reaction (OER) have large overpotentials and sluggish reaction kinetics.

Catalysts for oxygen reduction reaction or oxygen evolution reaction play key roles in enabling wide spread use of new technologies, such as fuel cells. Limiting factors in the wide scale commercialization of both ORR and OER include the efficiency and costs associated with the precious metals that are used to produce effective catalysts. Hence, there is a need for more efficient and less expensive ORR and OER catalysts.

SUMMARY

An oxide composition includes a composition having a general formula $A_{2-x}MO_y$; wherein A is Li or Na, M is selected from the group consisting of Co, Mn, Fe, Ni, Ti, V, Ge, Zr, Mo, Hf, Os, Ru, Rh, Pd, Sn, Ir, Pt, Au, Ag and mixtures thereof, and y is 2 to 3. The composition has an oxygen vacancy formation energy or oxygen binding energy of about −1 to about 1 eV/atom obtained by electrochemically tuning x in a range of 0 to 2.

A process for optimizing oxygen reduction or oxygen evolution catalytic activity includes providing a metal oxide of a formula $A_{2-x}MO_y$; wherein A is Li or Na, wherein x is 0 to 2, wherein y is 2 to 3, and M is selected from the group consisting of Co, Mn, Fe, Ni, Ti, V, Ge, Zr, Mo, Hf, Os, Ru, Rh, Pd, Sn, Ir, Pt, Au, Ag and mixtures thereof. The process includes electrochemically tuning an initial value of x to improve catalytic activity of oxygen reduction or oxygen evolution reactions.

A process for maintaining electrochemical stability of an oxide composition in an oxygen reduction or oxygen evolution reaction includes providing a metal oxide of a formula $A_{2-x}MO_y$; wherein A is Li or Na, wherein x is 0 to 2, wherein y is 2 to 3, and M is selected from the group consisting of Co, Mn, Fe, Ni, Ti, V, Ge, Zr, Mo, Hf, Os, Ru, Rh, Pd, Sn, Ir, Pt, Au, Ag and mixtures thereof. The process includes preparing the metal oxide composition and electrolyte composition to have a region of stability for the oxide catalyst in the Pourbaix diagram, encompassing the OER or ORR working electrochemical potential and pH values.

BRIEF DESCRIPTION OF FIGURES

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
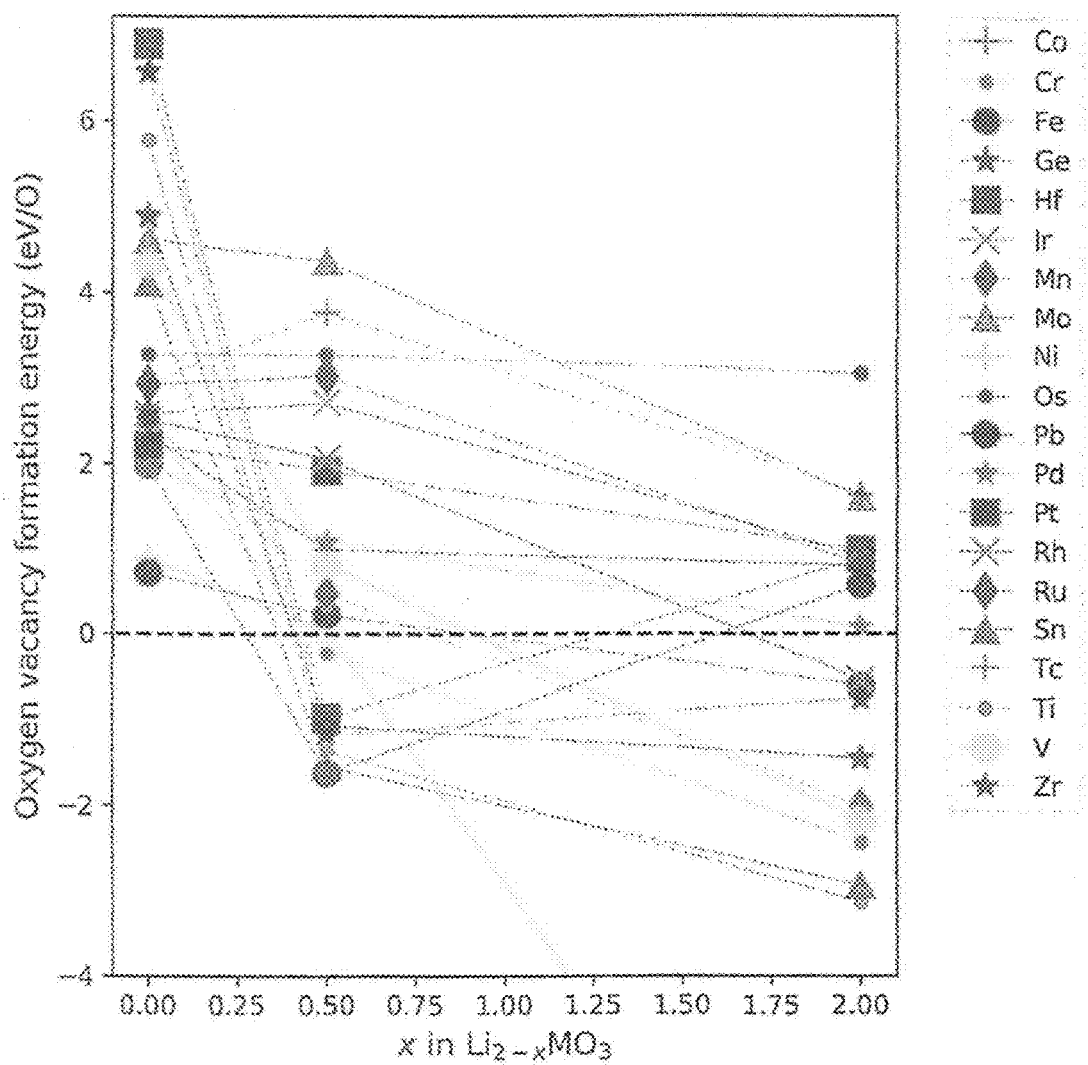
FIG. 1 describes oxygen vacancy formation energies of $Li_{2-x}MO_3$ materials as a function of delithiation (x ranging between 0 and 2).

The following description is not to be taken in a limiting sense, but is made merely for the purpose of describing the general principles of exemplary embodiments. The scope of the invention should be determined with reference to the claims.

Cost effective catalysts material are provided that possess improved activity and stability, and which may include less expensive materials. The oxide compositions include compositions having a general formula $A_{2-x}MO_y$. In this aspect, x is a "handle" to find optimal A content that would deliver the best catalytic performance in a chemical system.

A process is provided for optimizing oxygen reduction or oxygen evolution catalytic activity. The process provides the ability to find the optimal catalytic performance or highest OER or ORR reaction rate or the lowest overpotential at a given current density for the given catalytic material, by tuning A and hence, the binding strength of O. The ability to electrochemically control the content of A, provides a "dynamic" catalyst, where one can apply and alternate between two biases to shift back and forth between two A contents in $A_{2-x}MO_y$, in an electrochemical setup, to dynamically tune the catalyst "on-the-fly" for optimal adsorption and desorption stages for catalytic reaction.

Oxide Compositions

Li-ion or similar rechargeable battery electrodes can be utilized and mobile ion content can be tuned to control the electronic structure of the material that governs O binding and ultimately the ORR or OER catalytic activity. Optimal catalytic activity is achieved at delithiation levels near, but before the evolution of $O_2$ (i.e. discharge states of electrodes normally avoided in Li-ion battery operations). If these layered materials are delithiated too deeply below a certain Li content, then the oxygen in the material destabilizes and tends to form O—O dimers and evolve as $O_2$ gas or react with other materials in the environment. This Li content threshold is a function of the structure of the oxide, chemical identity of the redox active or inactive metals, and other factors.

Oxide compositions include compounds having a general formula $A_{2-x}MO_y$. In this aspect, these layered materials include a mobile ion A, where A is an alkali metal such as lithium (Li) or sodium (Na). Li and Na are useful for electrochemically tuning a binding strength of oxygen.

Further to the general formula, M is a metal ion that may have multiple nominal oxidation states. In this aspect, M may include metals such as cobalt (Co), manganese (Mn), iron (Fe), nickel (Ni), titanium (Ti), vanadium (V), germanium (Ge), zirconium (Zr), molybdenum (Mo), hafnium (Hf), osmium (Os), ruthenium (Ru), rhodium (Rh), lead (Pb), tin (Sn), iridium (Ir), platinum (Pt), gold (Au), silver (Ag), and mixtures thereof. In another aspect, M includes metal ions such Pt, Rh, Ir, Ru, Pd, Au, Ag, Os and mixtures thereof.

In one aspect, M is a single element, and in another aspect, M is a mixture of elements. A mixture of M may include metals such as Pt, Rh, Ir, Ru, Pd, Au, Ag, Os and one or more elements that include Fe, Mn, Cu, and Ni. M may include any ratio of these elements. Some examples of element combinations include Pt/Fe, Rh/Ni and Pd/Mn and similar combinations.

The oxide composition has an oxygen vacancy formation energy or oxygen binding energy of about −1 to about 1 eV/atom. The oxygen binding strength, and therefore the ORR or OER catalytic performance of the oxide composition, can be controlled by altering the electronic structure of Li-ions in Li-metal oxide or similar Na-ion, Na-metal oxide.

For example, in a Li-rich $Li_2MnO_3$ electrode, Mn has a nominal oxidation state of 4+. As Li is being removed, the nominal oxidation state of Mn starts increasing. However, in actuality, electronic states of Mn (d-electrons) and O (p-electrons) are overlapping and with Li removal, electrons normally associated with O are being removed as well, inducing a valence state of −2+m for O. As this continues, and the electronic structure of O anion become more and more unfavorable for binding (i.e. nominal valence approaching −1, after a certain point, O-dimer formation in the material can be favored, and $O_2$ gas may subsequently evolve. The $Li_{2-x}MnO_3$ material system can be scanned within 0<x<2 to find an optimal catalytically active composition, presence of which is expected from the demonstrated controllability of oxygen vacancy formation energy by tuning of x in FIG. 1.

FIG. 1 describes oxygen vacancy formation energies of $Li_{2-x}MnO_3$ materials as a function of delithiation (x). The figure demonstrates the ability to control O binding of strength of different metal oxide compositions via Li content. In this aspect, the oxide composition is a layered crystal structure capable of insertion and desorption of lithium or sodium ions. Outside the range of oxygen vacancy formation or binding energy where optimal material composition delivering the best catalytic activity (measured in terms of the current density) is, the current density would effectively be an order of magnitude lower. In this aspect, a current density for an optimal material composition delivering a significant catalytic activity is about 1 $mA/cm^2$ or greater.

The oxide compositions may be provided as part of an electrode. In one aspect, surface areas of oxide compositions are enhanced by providing the oxide compositions in a nanoparticle structure or in a nanosheet structure.

Optimizing Oxygen Reduction or Oxygen Evolution Catalytic Activity

A process for optimizing oxygen reduction or oxygen evolution catalytic activity includes providing a metal oxide having a general formula $A_{2-x}MO_y$ and electrochemically tuning an initial value of x to improve catalytic activity of oxygen reduction or oxygen evolution reactions. The initial value of x before tuning may be the as-synthesized composition of $A_{2-x}MO_y$.

The metal oxide of the general formula is a layered material that includes a mobile ion where A is an alkali metal such as lithium (Li) or sodium (Na). Li and Na are useful for electrochemically tuning a binding strength of oxygen. Further to the general formula, M is a metal ion that may have multiple nominal oxidation states. In this aspect, M may include metals such as cobalt (Co), manganese (Mn), iron (Fe), nickel (Ni), titanium (Ti), vanadium (V), germanium (Ge), zirconium (Zr), molybdenum (Mo), hafnium (Hf), osmium (Os), ruthenium (Ru), rhodium (Rh), lead (Pb), tin (Sn), iridium (Ir), platinum (Pt), gold (Au), silver (Ag), and mixtures thereof. In another aspect, M includes metal ions such Pt, Rh, Ir, Ru, Pd, Au, Ag, Os and mixtures thereof. In one aspect, M is a single element, and in another aspect, M is a mixture of elements. A mixture of M may include metals such as Pt, Rh, Ir, Ru, Pd, Au, Ag, Os and one or more elements that include Fe, Mn, Cu, and Ni.

The oxide composition is a layered crystal structure capable of insertion and desorption of lithium or sodium ions. In this aspect, the process includes electrochemically tuning an initial value of x by applying a bias or current to the metal oxide composition to provide an oxygen binding strength for adsorption or desorption of oxygen. The value of x is adjusted to provide the oxide composition with an oxygen vacancy formation energy or oxygen binding energy of about −1 to about 1 eV/atom. The tuning may depend upon the desired catalytic activity.

Maintaining Electrochemical Stability of an Oxide Composition

A process for maintaining electrochemical stability of an oxide composition in an oxygen reduction or oxygen evolution reaction includes providing a metal oxide having a general formula $A_{2-x}MO_y$ and an electrolyte composition and preparing the metal oxide composition to have a region of stability in the Pourbaix diagram encompassing the OER or ORR working electrochemical potential and pH values. The electrolyte composition includes a salt of M and/or a salt of A.

The metal oxide of the general formula is a layered material that includes a mobile ion where A is an alkali metal such as lithium (Li) or sodium (Na). Li and Na are useful for electrochemically tuning a binding strength of oxygen. Further to the general formula, M is a metal ion that may have multiple nominal oxidation states. In this aspect, M may include metals such as cobalt (Co), manganese (Mn), iron (Fe), nickel (Ni), titanium (Ti), vanadium (V), germanium (Ge), zirconium (Zr), molybdenum (Mo), hafnium (Hf), osmium (Os), ruthenium (Ru), rhodium (Rh), lead (Pb), tin (Sn), iridium (Ir), platinum (Pt), gold (Au), silver (Ag), and mixtures thereof. In another aspect, M includes metal ions such Pt, Rh, Ir, Ru, Pd, Au, Ag, Os and mixtures thereof. In one aspect, M is a single element, and in another aspect, M is a mixture of elements. A mixture of M may include metals such as Pt, Rh, Ir, Ru, Pd, Au, Ag, Os and one or more elements that include Fe, Mn, Cu, and Ni. In this aspect, the oxide composition is a layered crystal structure capable of insertion and desorption of lithium or sodium ions.

Figure 2:
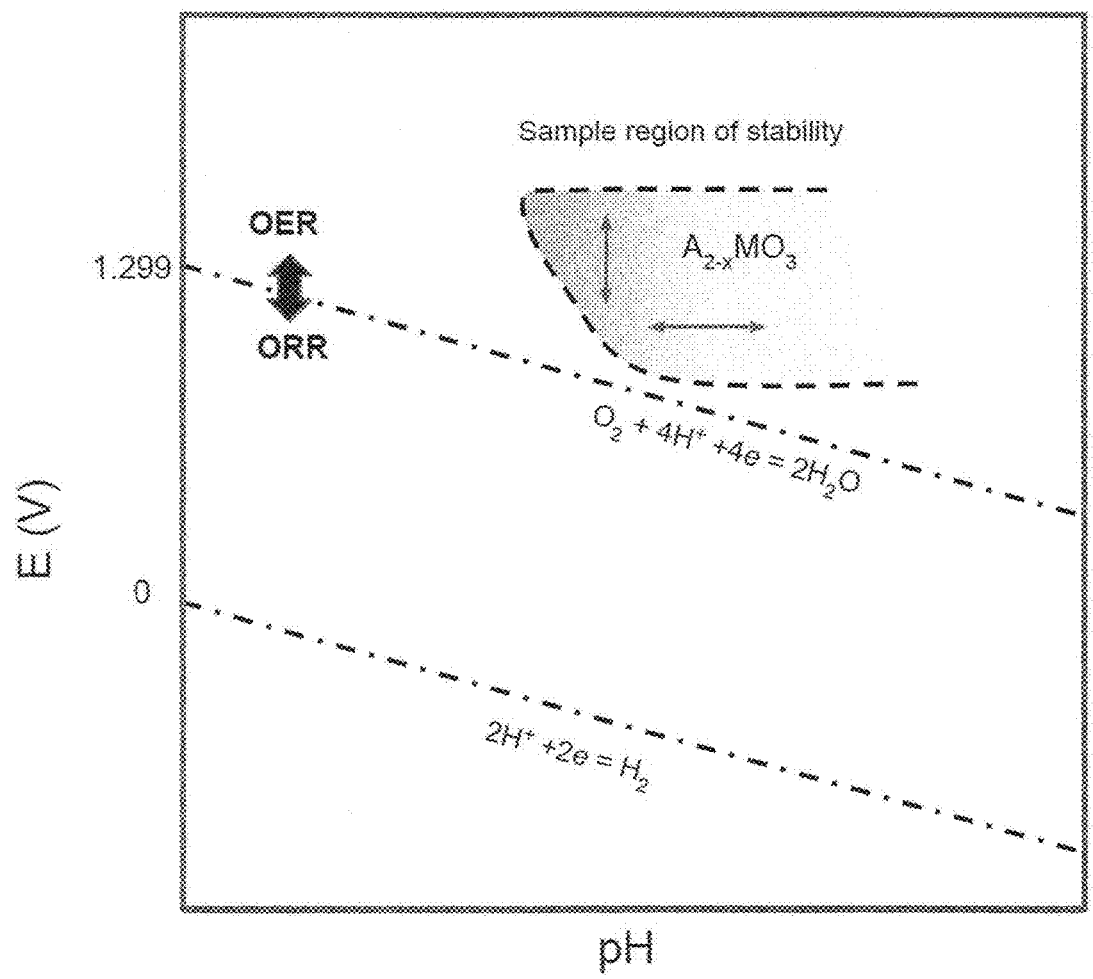
FIG. 2 shows a Pourbaix diagram used for determining the stability of the compositionally tuned layered material near oxygen evolution reaction potentials.

As shown in FIG. 2, a Pourbaix diagram can be used to determine the stability of the compositionally tuned layered material near the oxygen evolution reaction potentials. Electrode potential can be adjusted in conjunction with O-binding strength for ensuring stability in the OER or ORR reaction regions. The potential of the electrode changes with Li content and shifts upward as more Li is removed. A and M concentrations in the electrolytes can be utilized to adjust the location of electrode potentials.

Conditions or parameters of aqueous solution systems within a system are monitored and maintained relative to the metal oxide stability area (or co-precipitation or metal oxide stability area when other metals are processed) with regard to electrochemical (oxidizing) potential (Eh) range and pH range at the prescribed system molarity, temperature and pressure in order to provide an Eh-pH combination to achieve stable solution equilibrium, as defined by the metal oxide stability area as delineated in, for example a Pourbaix Diagram. The process includes selecting an appropriate pH range for use with the particular metal salt and solvent employed by reference to a Pourbaix diagram. The lines in the Pourbaix Diagram show the equilibrium conditions, that is, where the activities are equal, for the species (or reaction products) on each side of that line. On either side of the line, one form of the species will instead be said to be predominant. The pH, and/or the suitable pH agent, is selected such that the formation of the metal oxide species is predominant over the formation of the metal hydroxide species. FIG. 2 illustrates that by adjusting A and/or M salt concentration in electrolyte, one can shift or modify the shape of the stability region (as illustrated by arrows shown) for $A_{2-x}MO_3$ (catalyst), and hence make it relatively more stable under OER or ORR conditions.

In another aspect, electrochemical stability is enhanced by adding a salt of M and or a salt of A in the electrolyte. Layered crystal materials may be exfoliated and dispersed in an electrolyte to expose more surface area for catalytic activity.

Pourbaix diagram encompassing the metal oxide of interest can be obtained in advance from the literature or from theoretical calculations, and/or stability can be step by step controlled by incremental additions of salts of M or Li into the electrolyte. Electrolyte would normally have a large affinity for the dissolved ions of M and Li if it does not contain these ions upfront, hence can destabilize the metal oxide and result in its dissolution/degradation. The gradual addition of the corresponding M and/or Li salts into electrolyte can be used as a mechanism to lower the mentioned affinity of electrolyte for these ions, and support stabilization of the catalyst.

For example, if the metal oxide is not stable under the pH and electrochemical potential pertaining to its catalytic reaction (ORR or OER), addition of a salt of M to the electrolyte may stabilize it by increasing the chemical potential of M in the electrolyte (or decreasing the electrolytes affinity for M). Similarly, if the metal oxide is not stable under the pH and electrochemical potential pertaining to its catalytic reaction (ORR or OER), addition of a salt of Li to the electrolyte may stabilize it.

Example: Manufacture of Batteries Using Metal Oxide Catalyst Compositions

Batteries, such as for example lithium air batteries, may utilize the metal oxide compositions as catalysts. An example of manufacturing the lithium air battery is as follows. First, metal oxide catalyst, a conducting agent, and a binder are mixed, and then are added to an appropriate solvent to prepare a positive electrode slurry. The positive electrode slurry is coated and dried on a surface of a current collector, optionally followed by press-molding in order to improve the electrode density, thereby preparing a positive electrode.

Next, a negative electrode is mounted in one side of a case, and the positive electrode with a separator is mounted in another side opposite to the negative electrode, wherein the separator is disposed on the side of the positive electrode facing toward the negative electrode. An electrolyte is injected between the positive electrode and the negative electrode, a porous current electrode is disposed on the positive electrode, and a pressing member that allows air to reach the positive electrode is pushed to fix a cell, thereby completing the manufacture of the lithium air battery. A lithium ion conductive solid electrolyte membrane may be further disposed on one surface of the negative electrode.

The case may be divided into upper and lower parts, which contact the negative and positive electrodes, respectively. An insulating resin may be disposed between the upper and lower parts to electrically insulate the positive and negative electrodes from each other.

The lithium air battery may be either a lithium primary battery or a lithium secondary battery. The lithium air battery may have any of various shapes, and in some embodiments, may have a shape like a coin, a button, a sheet, a stack, a cylinder, a plane, or a horn. The lithium air battery may be used as a large-scale battery for electric vehicles.

During discharge of the battery, oxygen flows into the composite cathode from the outside and undergoes an oxygen reduction reaction (ORR) with lithium ions derived from the anode to produce a lithium oxide. On the other hand, during charge of the battery, oxidation of the lithium oxide occurs in an oxygen evolution reaction (OER), and lithium ions migrate to the anode and are electrodeposited as lithium metal.

While the invention herein disclosed has been described by means of specific embodiments, examples and applications thereof, numerous modifications and variations could be made thereto by those skilled in the art without departing from the scope of the invention set forth in the claims.

What is claimed is:

1. An oxygen reduction reaction (ORR) and/or oxygen evolution reaction (OER) catalyst comprising a formula $A_{2-x}MO_y$;

wherein A is Li,
y is 2 to 3,
wherein M is Pt, and
wherein the ORR and/or OER catalyst has an oxygen vacancy formation energy or oxygen binding energy of about −1 to about 1 eV/atom obtained by electrochemically tuning x in a range of 0 to 2.

2. The ORR and/or OER catalyst of claim 1 wherein the ORR and/or OER catalyst is a layered crystal structure capable of insertion and desorption of lithium ions.

3. The ORR and/or OER catalyst of claim 1 wherein the ORR and/or OER catalyst is provided in a nanoparticle structure.

4. The ORR and/or OER catalyst of claim 1 wherein the ORR and/or OER catalyst is provided in a nanosheet structure.

5. A process for optimizing oxygen reduction or oxygen evolution catalytic activity, the process comprising:
   providing an oxygen reduction (ORR) and/or oxygen evolution reaction (OER) catalyst of a formula $A_{2-x}MO_y$;
   wherein A is Li,
   wherein x is 0 to 2,
   wherein y is 2 to 3,
   wherein M is Pt; and
   electrochemically tuning an initial value of x to improve catalytic activity of oxygen reduction or oxygen evolution reactions.

6. The process of claim 5 wherein the electrochemically tuning of an initial value of x includes applying a bias to the ORR and/or OER catalyst.

7. The process of claim 5 wherein the process includes electrochemically tuning an amount of A by applying a current to the ORR and/or OER catalyst to provide an oxygen binding strength for absorption or desorption of oxygen.

8. The process of claim 5 wherein the ORR and/or OER catalyst is a layered crystal structure capable of insertion and desorption of lithium ions.

* * * * *